(12) United States Patent
Keeling et al.

(10) Patent No.: US 9,050,552 B2
(45) Date of Patent: Jun. 9, 2015

(54) HOT GAS FILTRATION SYSTEM

(71) Applicant: Cambridge International Inc., Cambridge, MD (US)

(72) Inventors: Maxwell Lawrence Keeling, Cambridge, MD (US); Matthew Charles O'Connell, Cambridge, MD (US); George H. Messick, Jr., Cambridge, MD (US); Robert E. Maine, Jr., Salisbury, MD (US)

(73) Assignee: Cambridge International, Inc., Cambridge, MD (US)

( * ) Notice: Subject to any disclaimer, the term of this patent is extended or adjusted under 35 U.S.C. 154(b) by 100 days.

(21) Appl. No.: 13/875,747

(22) Filed: May 2, 2013

(65) Prior Publication Data

US 2013/0291727 A1    Nov. 7, 2013

Related U.S. Application Data

(60) Provisional application No. 61/641,447, filed on May 2, 2012.

(51) Int. Cl.
*B01D 46/00* (2006.01)
*B01D 46/18* (2006.01)
*B01D 46/20* (2006.01)
*B01D 46/22* (2006.01)

(52) U.S. Cl.
CPC .............. *B01D 46/185* (2013.01); *B01D 46/20* (2013.01); *B01D 46/0072* (2013.01); *B01D 46/18* (2013.01); *B01D 46/22* (2013.01)

(58) Field of Classification Search
CPC ...... B01D 46/18; B01D 46/185; B01D 46/20; B01D 46/22; B01D 46/48; B01D 46/0072
USPC .............. 55/290, 351, 354, 428, 432; 95/277
See application file for complete search history.

(56) References Cited

U.S. PATENT DOCUMENTS

| | | | | |
|---|---|---|---|---|
| 3,375,638 | A * | 4/1968 | Dungler | ............................ 96/39 |
| 2007/0080048 | A1 | 4/2007 | Messick, Jr. et al. | |
| 2010/0269699 | A1 * | 10/2010 | Jones | ................................ 96/43 |

FOREIGN PATENT DOCUMENTS

| | | |
|---|---|---|
| CH | 389 366 A | 3/1965 |
| CH | 688 402 A5 | 9/1997 |
| EP | 0 906 778 B1 | 7/1999 |

* cited by examiner

Primary Examiner — Robert Clemente
(74) Attorney, Agent, or Firm — Buchanan, Ingersoll & Rooney PC (57) ABSTRACT

A filtration system particularly suited for removing a particulate material from a hot gas includes a housing, a collection system including at least one collection belt, a cleaning system to clean the collected particulate material from the at least one collection belt, and a removal system for removing the collected particulate material from the housing.

23 Claims, 8 Drawing Sheets

HOT GAS FILTRATION SYSTEM

TECHNICAL FIELD

The disclosure herein relates to a hot gas filtration system, more particularly to a hot gas filtration system using a moving collection surface to remove particulate material from an air stream, and still more particularly, from a high temperature, high velocity and/or high moisture air stream.

BACKGROUND

Conventionally, before emitting so-called "industrial waste gases" and/or "process gases", air purification is performed to remove various types of fine particulates contained in the industrial waste gases, such as mist and dust containing sticky and abrasive particulate powders, which pollute the atmosphere, and/or process gases containing similar particulate which could damage process equipment used in the wood, pharmaceutical and mining industries, for example.

Previous air stream filtration methods include, for example, electrostatic dust precipitators, cyclone separator systems, and rigid ceramic filters, each of which has suffered from certain drawbacks and inefficiencies. The cleaning of the collection plates in electrostatic precipitators presents a problem inasmuch as a substantial amount of reentrainment of the dust occurs. In cyclone separators, the particulate laden gas is introduced under pressure, and thus vessel pressure and "collapsing pressure" due to pressure loss through the cyclone system are a common cause of concern. Ceramic filter devices on the other hand comprise porous ceramic materials which, when subjected to high temperature corrosive environments, the filter elements can break under the influence of these conditions.

It is an object of the disclosure herein to provide a hot gas filtration system with improved reliability and efficiency, and in particular, a hot gas filtration system capable of filtering air streams that are high temperature, high velocity, high moisture and carrying sticky or abrasive particulates.

SUMMARY

These and other objects of the disclosure are provided by a filtration system for removing a particulate material, comprising a housing having an internally formed air path communicating between an inlet for incoming polluted air containing particulate material and an air outlet for emitting clean air filtered by removing the particulate material; a collection system provided in the air stream to collect the particulate material, said collection system including at least one collection belt; a cleaning system provided to clean the collected particulate material from the at least one collection belt; and a removal system for removing the collected particulate material from said housing.

BRIEF DESCRIPTION OF THE DRAWING FIGURES

These and other objects, features, and advantages of the disclosure herein will become more readily apparent to those skilled in the art upon reading the following detailed description, in conjunction with the appended drawings in which.

DETAILED DESCRIPTION OF THE INVENTION

Figure 1:
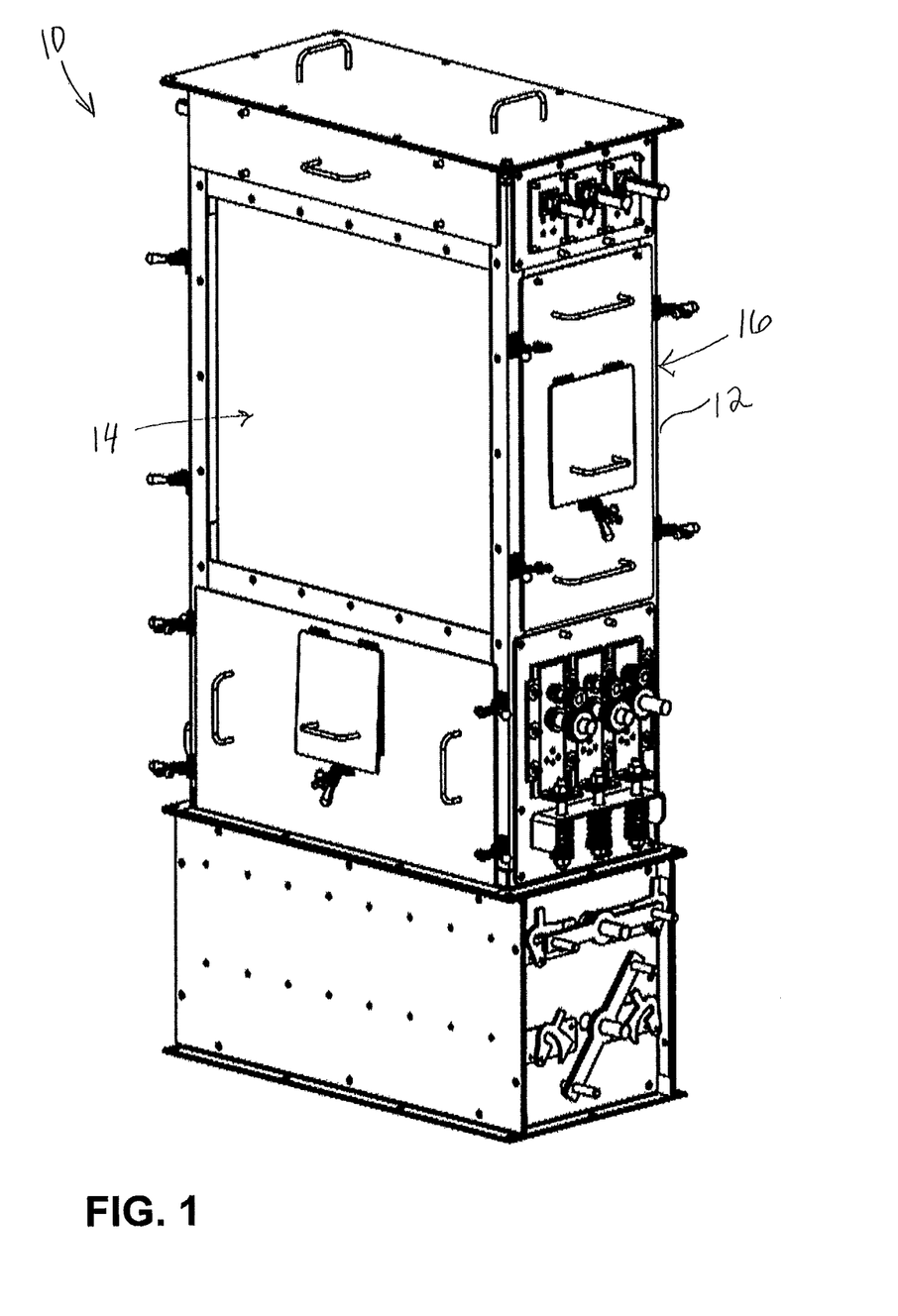
FIG. 1 is a perspective view of a hot gas filtration system according to an exemplary embodiment of the disclosure.
Figure 2:
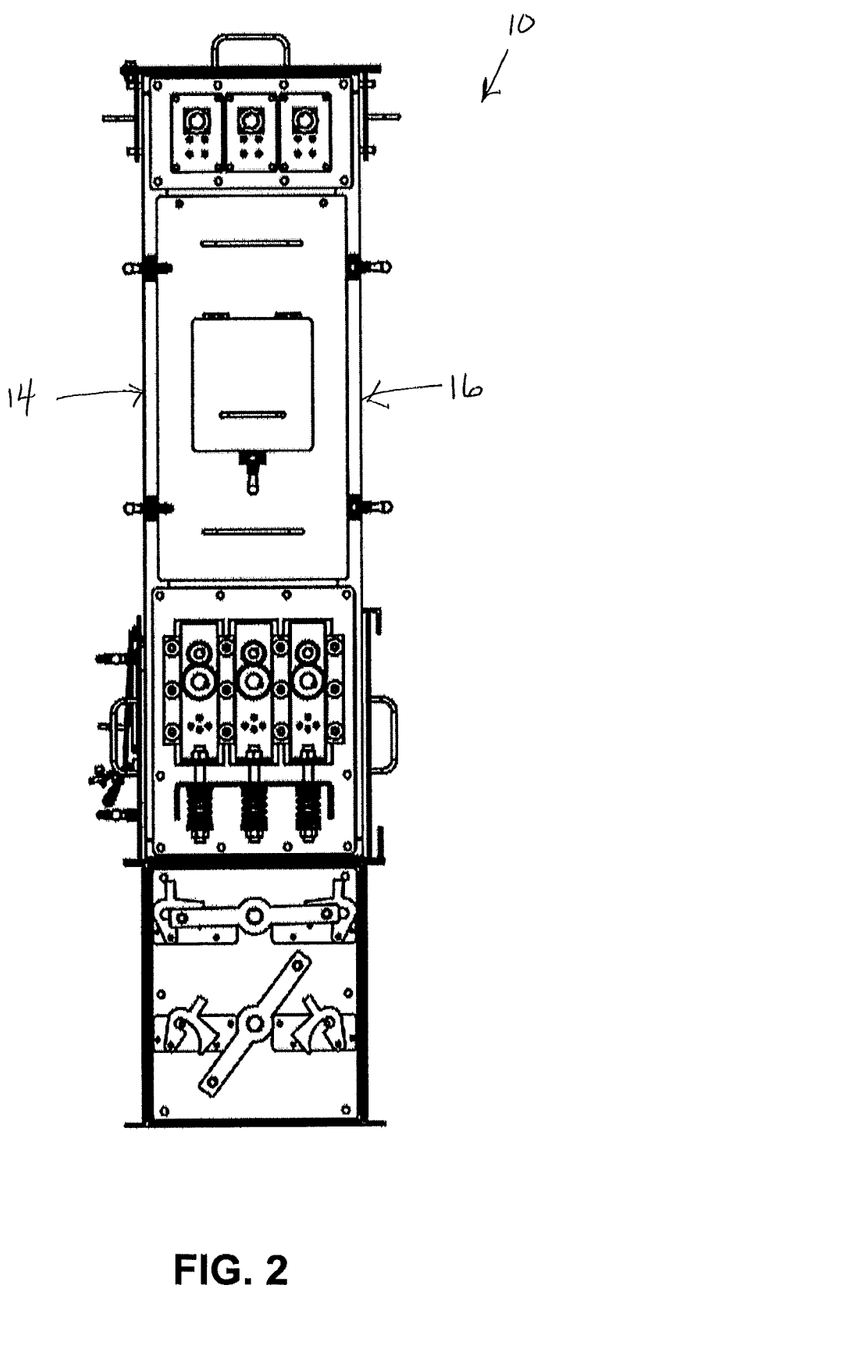
FIG. 2 is a side view of the filtration system shown in FIG. 1.
Figure 3:
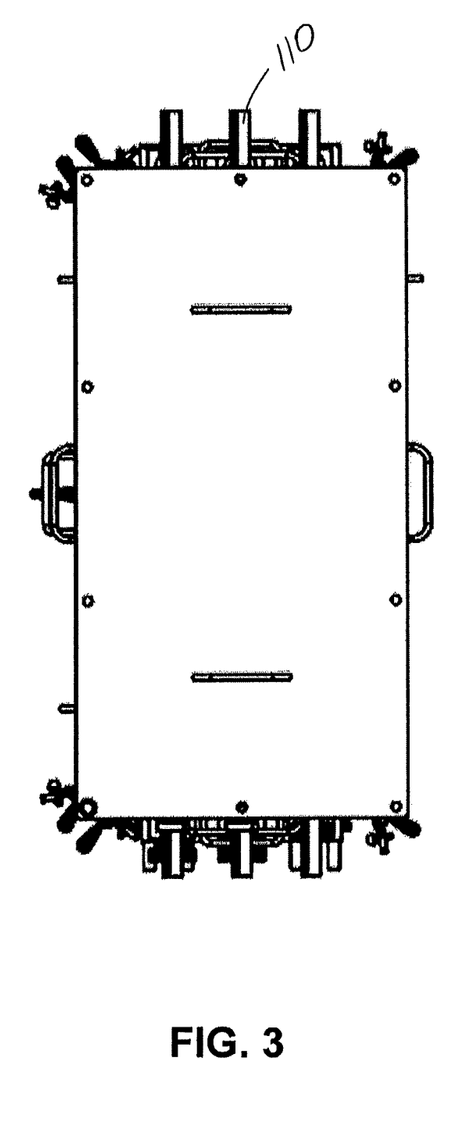
FIG. 3 is a top view of the filtration system shown in FIG. 1.
Figure 4:
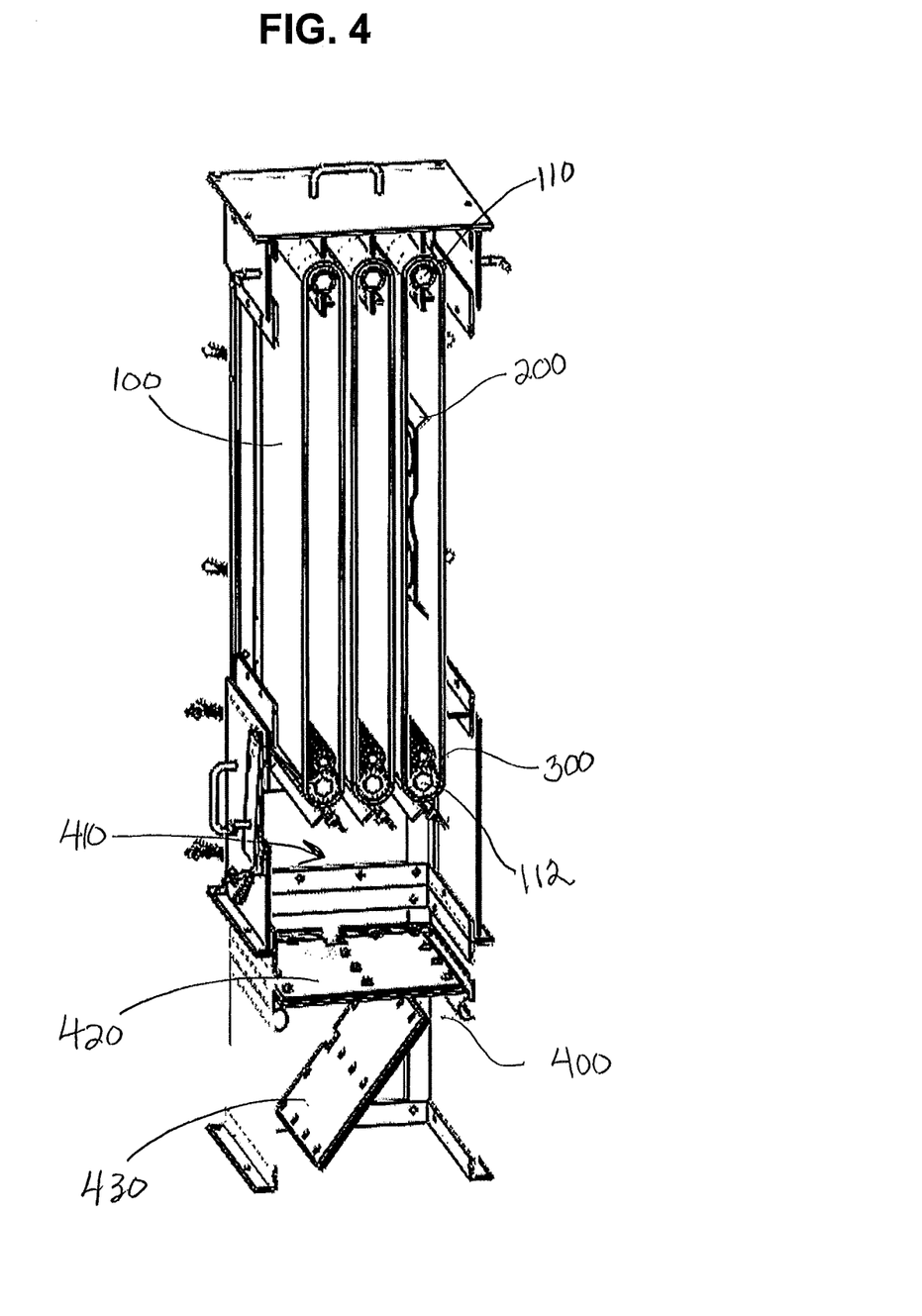
FIG. 4 is a side perspective view of the filtration system shown in FIG. 1, with portions of the housing removed for clarity.
Figure 5:
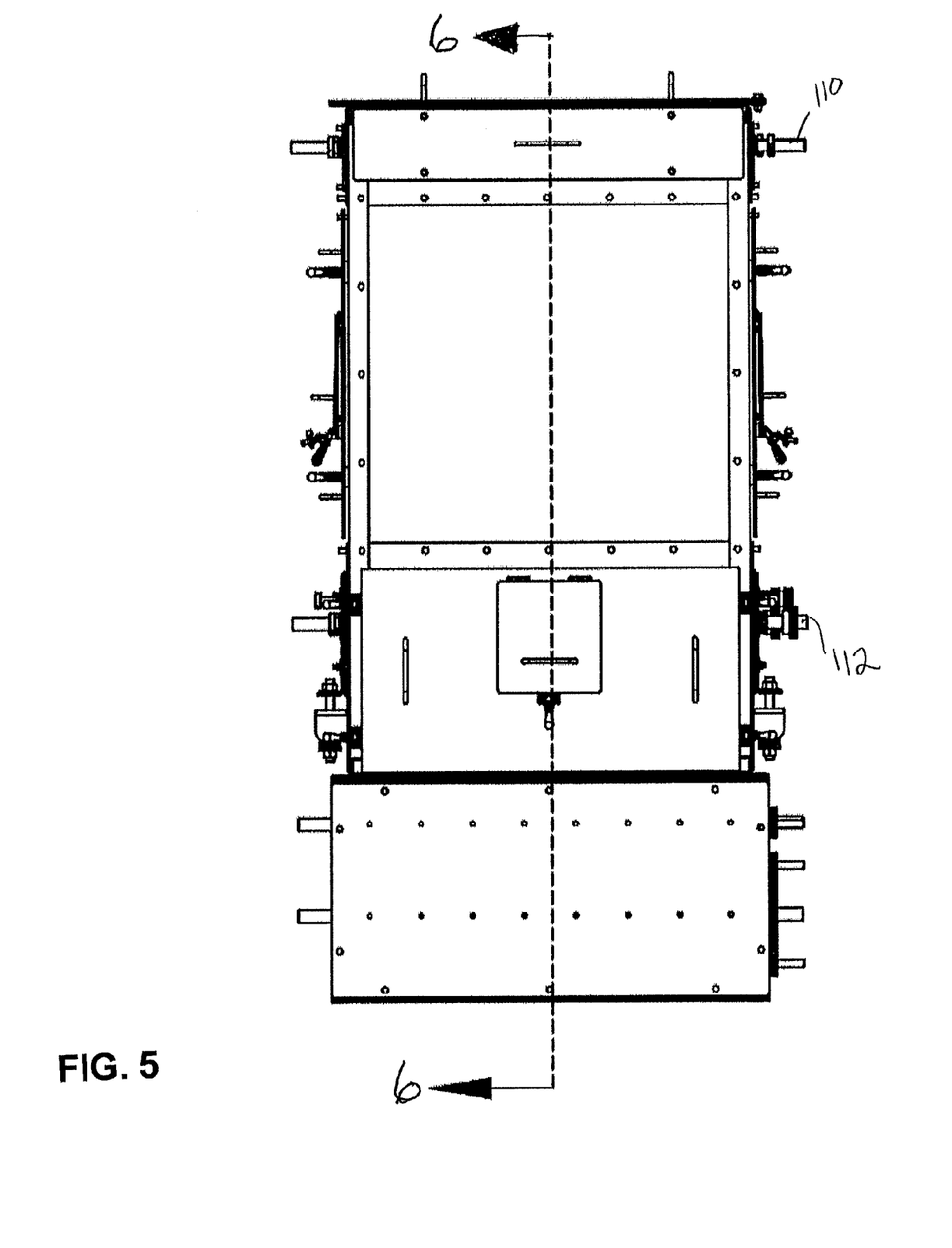
FIG. 5 is a front view of the filtration system shown in FIG. 1.

A filtration system 10 in accordance with a preferred embodiment of the invention disclosed herein is shown best in FIGS. 1 and 4. Filtration system 10 is confined within a housing 12 having an air inlet 14 and an air outlet 16. Filtration system 10 includes one or more movable belts 100 which collect the particulate from the air stream, one or more air flow diverting plates 200 forcing the air stream to flow more uniformly across the surface area of the belts, a belt cleaning system 300 to remove the particulate adhered to the belts 100, and a clog-resistant airlock 400 allowing removal of the collected particulate from the filtration system 10. The filtration system 10 is particularly suited for use with hot gas or air streams that are high temperature, high velocity, and/or high moisture and which carry sticky and/or abrasive particulates.

Figure 6:
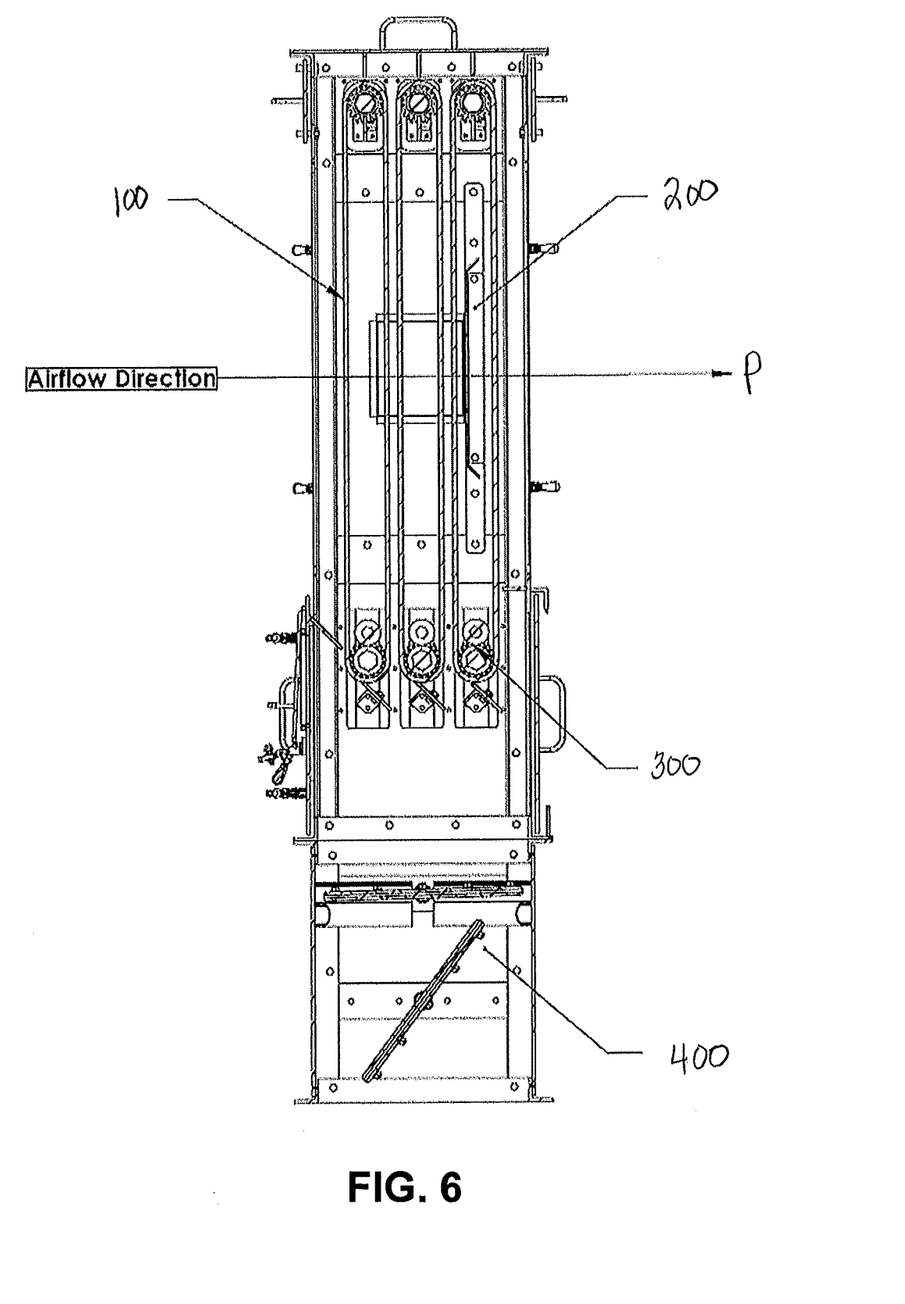
FIG. 6 is a cross-sectional view taken generally along line 6-6 as shown in FIG. 5.

The airflow diverting plates 200, as shown also in FIG. 6, are positioned in the air stream path "P" so as to force the air to flow more uniformly across the area of the belts 100. The plates 200 also serve to collect large particles of particulate entrained in the air stream. The movement of the belts 100, as described below, is in close proximity to the surface of the diverting plates 200 so that the belts 100 clean the surface of the plates and limits the buildup of material on them.

Each of the belts 100 is driven in either periodic or continuous rotation, and is designed as a continuous loop so as to maximize the available collection surface area while minimizing pressure drop. Referring to FIG. 4, drive sprockets (not numbered) are disposed on the ends of a support shaft 110, 112 arranged at the top and the bottom of each belt, respectively. Either the top or the bottom drive shafts, preferably the top shafts 110, include several sprockets across the width of the belt (about every 6 inches) that drive the belt, while the other shaft, preferably the bottom shaft 112, includes a toothed drive roll 310, discussed further below, which engages substantially every opening in the belt. Collection belt 100 preferably comprises a metal conveyor belt, such as a flat wire conveyor belt which is described more fully in U.S. Patent Publication No. 2007/0080048, the contents of which are hereby incorporated by reference.

Figure 8:
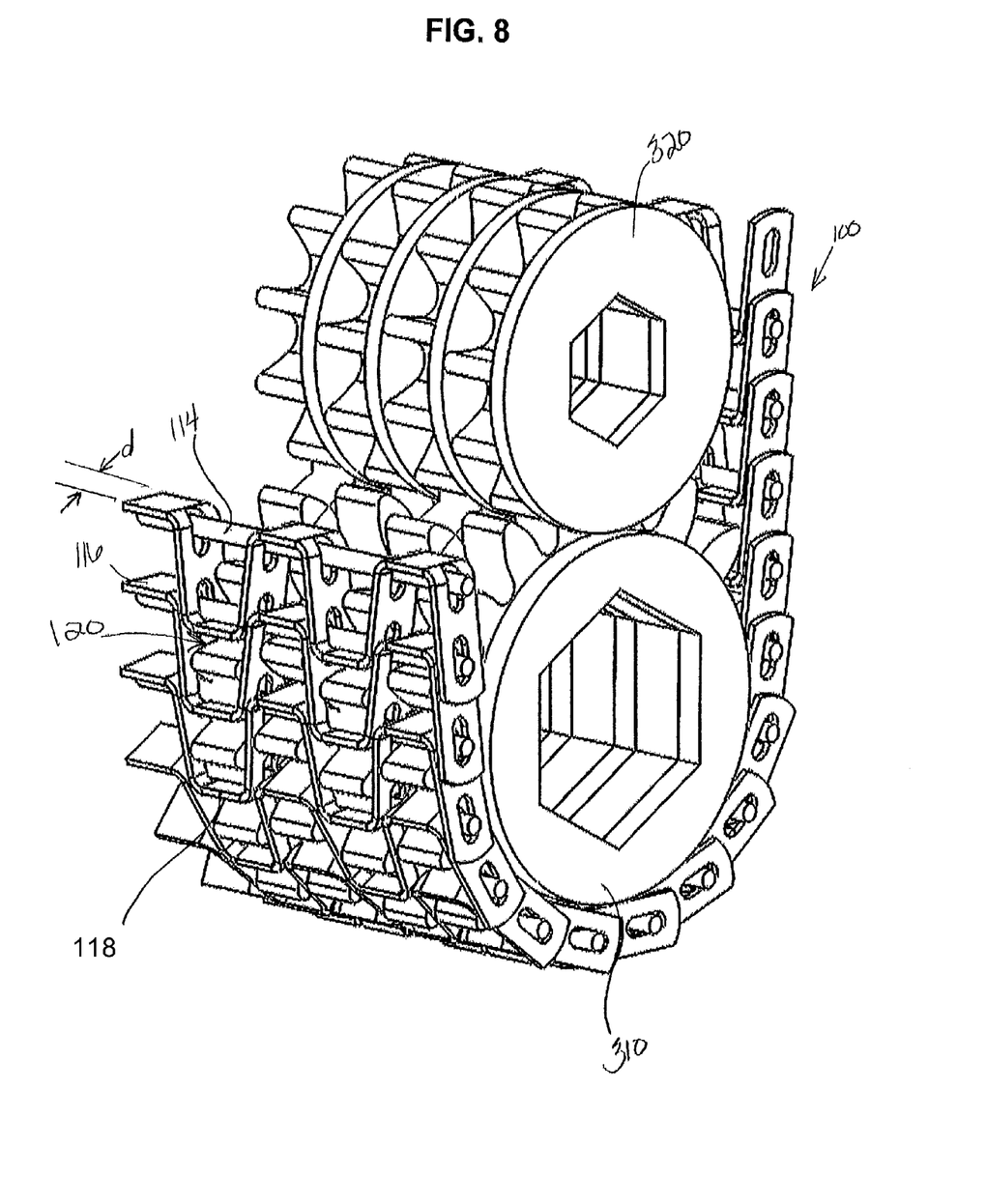
FIG. 8 is an enlarged partial view of the wire belt and belt cleaning system of the filtration system shown in FIG. 1.

Referring also to FIG. 8, belt 100 includes a plurality of spaced tractive rods 114 disposed in succession and transversely with respect to a direction of travel. Belt 100 further includes a plurality of rows of wickets 116 transversely disposed with respect to the direction of travel, and interconnecting the succession of rods 114. Each row of wickets 116 is comprised of a plurality of links 118, each link connecting a rod 114 with a following rod in the succession. The links 118 are preferably of uniform size and shape across the row, or of varying size and shape, to form a repeating pattern of openings 120. Unlike collection plates or rubber belts used in prior filtration systems, which present a substantially two-dimensional surface for collection, the use of belt 100 provides a three-dimensional collection surface area. That is, each wicket 116 has a depth "d" defining the thickness of the wicket and preferably ranging from approximately 0.188" to approximately 0.500", although other sizes could of course be utilized depending upon the particular installation.

Figure 7:
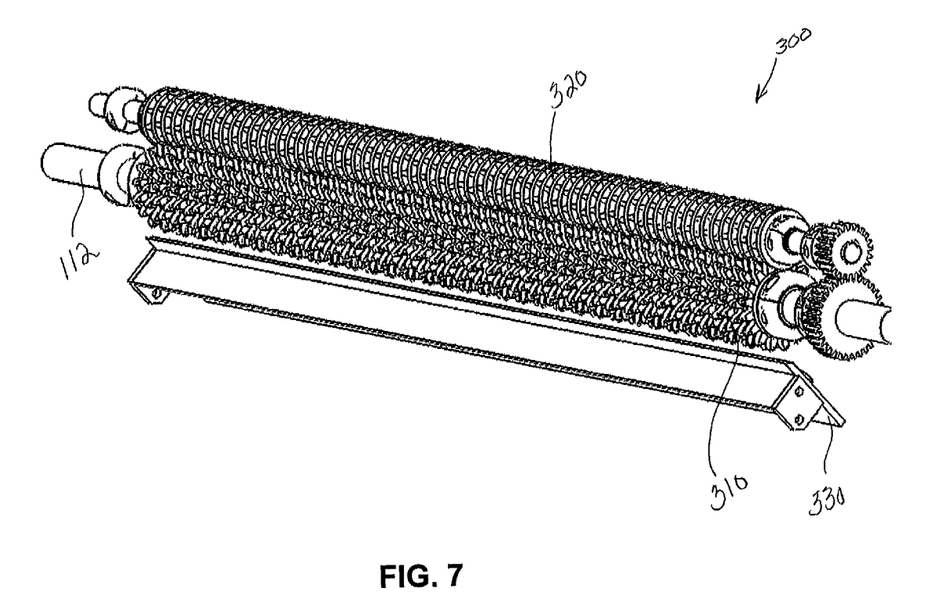
FIG. 7 is an enlarged view of the belt cleaning system shown in FIG. 4.

The belts 100 move gradually, through periodic or continuous rotation of the support shafts 110, 112, each of which further includes a plurality of sprockets or the toothed roll 310 which meshes with the openings 120 in the belt 100 defined by the links 118. Located at one or both of these shafts 110, 112 is the belt cleaning system 300, as shown in FIG. 7. The belt cleaning system 300 removes the adhered particulate from the belt 100 using the toothed drive roll 310 which meshes with openings 120 in the belt 100 to clean and drive the belt, in combination with a toothed cleaning roll 320 that meshes with the toothed roll 310 and thus cleans the toothed roll 310. The teeth on the toothed roll 310 are sized to correspond to the size of the openings 120 in the belt 100. The meshing of these two rolls 310, 320 also crushes any conglomerated particulate in the process. The belt cleaning system 300 may also include static scrapers 330 for removing material from the belt 100. Other types of belt cleaning systems may of course also be used, such as, for example, another mechanical cleaning system, or a cleaning system based on fluid or chemical treatment, depending on the nature of the particulate being removed.

The filtration system 10 operates in the following manner: the air stream enters the housing 12 and passes through the filtration system 10 in the direction of air flow path "P", thus passing through the openings 120 in the wire belts 100. Particulate impacts and adheres to the surfaces of the belt 100. One or more belts 100 may be used in the filtration system 100, for example, FIGS. 4 and 6 illustrate an embodiment having three belts. The use of multiple belts increases the probability of a given particle impacting a belt surface before passing through the filtration system, thus improving collection efficiency without dramatically increasing pressure drop across the system.

Referring to FIG. 4, removed particulate falls into a collection chamber 410 defined by a clog-resistant airlock 400. The airlock 400 uses a pair of rotating plates 420, 430 to allow collected particulate to be removed from the filtration system 10 while maintaining an air seal from outside the system. The plates 420, 430 rotate sequentially, with at least one in a horizontal position at all times. As each plate 420, 430 rotates, it is near the surface of the other plate 420, 430, thereby scraping off any large particulate buildup from adhering to the airlock plates.

The unique self-cleaning abilities of the internal components of the filtration system 10 allow it to operate continuously in air streams that would clog or damage other types of filtration systems, i.e., air streams that are high temperature, high velocity, and/or high moisture and which carry sticky and/or abrasive particulates.

Although certain preferred embodiments of the present invention have been shown and described in detail, it should be understood that various changes and modifications may be made therein without departing from the scope of the appended claims.

What is claimed is:

1. A filtration system for removing a particulate material, comprising:
   a housing having an internally formed air path communicating between an inlet for incoming polluted air containing particulate material and an air outlet for emitting clean air filtered by removing the particulate material;
   a collection system provided in the air stream to collect the particulate material, said collection system including at least one collection belt;
   a cleaning system provided to clean the collected particulate material from the at least one collection belt; and
   a removal system for removing the collected particulate material from said housing;
   wherein said collection system comprises a toothed drive roll configured to engage openings in said at least one collection belt and thereby drive said at least one collection belt; and
   wherein said cleaning system comprises a toothed cleaning roll meshing with said toothed drive roll, said toothed drive roll cleaning the at least one collection belt engaged therewith, and said toothed cleaning roll cleaning the toothed drive roll.

2. The filtration system according to claim 1, wherein said collection system further comprises a plurality of airflow diverting plates.

3. The filtration system according to claim 2, wherein said airflow diverting plates collect large particles of the particulate material.

4. The filtration system according to claim 1, wherein said collection system comprises opposing drive shafts for driving said at least one collection belt.

5. The filtration system according to claim 4, wherein one of said drive shafts includes said toothed drive roll.

6. The filtration system according to claim 1, wherein said at least one collection belt comprises a metal conveyor belt.

7. The filtration system according to claim 6, wherein said metal conveyor belt comprises a flat wire conveyor belt.

8. The filtration system according to claim 1, wherein said removal system comprises a collection chamber and an air lock, particulate material collected from the at least one collection belt being collected in said collection chamber and removed from said housing via said air lock.

9. The filtration system according to claim 8, wherein said air lock comprises a pair of rotating plates.

10. A method of removing a particulate material from an air stream comprising:
    passing an air stream through a housing having an internally formed air path communicating between an inlet for incoming polluted air containing particulate material and an air outlet for emitting clean air filtered by removing the particulate material;
    collecting particulate from the air stream with a collection system including at least one collection belt;
    cleaning the collected particulate material from the at least one collection belt; and
    removing the collected particulate material from said housing;
    wherein said cleaning step includes driving the at least one collection belt on a toothed drive roll comprising a plurality of teeth;
    wherein said cleaning step further includes providing a toothed cleaning roll meshing with the toothed drive roll so as to remove particulate material from the toothed drive roll.

11. The method according to claim 10, wherein said at least one collection belt includes a metal conveyor belt having a plurality of openings and said collecting step includes passing the air stream through the openings in the metal conveyor belt such that particulate material adheres to surfaces of the metal conveyor belt.

12. The method according to claim 11, wherein said cleaning step includes the plurality of teeth on the toothed drive roll engaging the plurality of openings in the metal conveyor belt to remove particulate material from the metal conveyor belt.

13. The method according to claim 12, wherein said removing step comprises collecting the particulate material removed from the metal conveyor belt in a collection chamber.

14. The method according to claim 13, wherein said removing step further comprises providing an airlock on the collection chamber and removing the particulate material from the collection chamber by way of the airlock while maintaining an air seal.

15. A filtration system for removing a particulate material, comprising:
   a housing having an internally formed air path communicating between an inlet for incoming polluted air containing particulate material and an air outlet for emitting clean air filtered by removing the particulate material;
   a collection system provided in the air stream to collect the particulate material, said collection system including at least one collection belt;
   a cleaning system provided to clean the collected particulate material from the at least one collection belt; and
   a removal system for removing the collected particulate material from said housing;
   wherein said removal system comprises a collection chamber and an air lock, particulate material collected from the at least one collection belt being collected in said collection chamber and removed from said housing via said air lock.

16. The filtration system according to claim 15, wherein said air lock comprises a pair of rotating plates.

17. The filtration system according to claim 15, wherein said collection system further comprises a plurality of airflow diverting plates.

18. The filtration system according to claim 17, wherein said airflow diverting plates collect large particles of the particulate material.

19. The filtration system according to claim 15, wherein said collection system comprises opposing drive shafts for driving said at least one collection belt.

20. The filtration system according to claim 19, wherein one of said drive shafts includes a toothed drive roll.

21. The filtration system according to claim 15, wherein said at least one collection belt comprises a metal conveyor belt.

22. The filtration system according to claim 21, wherein said metal conveyor belt comprises a flat wire conveyor belt.

23. The filtration system according to claim 15, wherein said collection system comprises a toothed drive roll configured to engage openings in said at least one collection belt and thereby drive said at least one collection belt.

* * * * *